UNITED STATES PATENT OFFICE.

JOHN B. DEEDS, OF TERRE HAUTE, INDIANA, ASSIGNOR TO ROBERT H. CATLIN, OF SAME PLACE.

METHOD OF TREATING ASBESTUS.

SPECIFICATION forming part of Letters Patent No. 400,756, dated April 2, 1889.

Application filed December 13, 1888. Serial No. 293,435. (No specimens.)

*To all whom it may concern:*

Be it known that I, JOHN B. DEEDS, a citizen of the United States, residing at Terre Haute, Vigo county, Indiana, have invented new and useful Improvements in the Method of Treating Asbestus, of which the following is a specification.

This invention relates to certain new and useful improvements in the treatment of asbestus or mineral wool; and it consists, substantially, in such features of improvement as will hereinafter be more particularly described, and pointed out in the claim.

In an application for Letters Patent filed by me on the 23d day of March, 1888, Serial No. 268,284, I have set forth and claimed the use of asbestus or mineral wool, combined with plumbago or black-lead, oil, and rosin, as a material for stuffing-box packing, wrapping for steam-joints, and all analogous purposes.

The present invetion is designed to cover the method of combining the several materials in such manner as to produce the article covered by my application for Letters Patent aforesaid, and the following is the manner in which the same is practiced, I take any given quantity of asbestus or mineral wool, (which should be of as fibrous a nature as can be had,) and thoroughly mix or intermingle therewith a suitable quantity of plumbago or black-lead, any proper oil, and preferably a little rosin to give increased body. Before admixture with the asbestus or mineral wool the plumbago, oil, and rosin are worked or kneaded into the consistency of a thin paste, the nature of the rosin rendering it necessary that the paste be hot at the time of treatment. The combined mass is placed in an air-tight box or vessel and subjected to the action of a degree of heat sufficient to cause the paste to flow or circulate all through the asbestus, thus thoroughly coating or covering the strands of fibers, after which the mass is allowed to cool. The qualities possessed by the paste are partially absorbed by the asbestus, and the result is that after cooling the compound can be readily manipulated, the same also having valuable characteristics for the purposes of the uses for which it is intended.

Having thus described my invention, what I claim, and desire to secure by Letters Patent, is—

The method herein described of treating asbestus or mineral wool, the same consisting in combining therewith, in proper quantity, a thin paste composed of plumbago, oil, and rosin, subjecting the mass to the action of heat, and then allowing the same to cool, as set forth.

In testimony whereof I have hereunto set my hand in the presence of two subscribing witnesses.

JOHN B. DEEDS.

Witnesses:
   ROBERT H. CATLIN,
   WILLIAM DIDRICH.